UNITED STATES PATENT OFFICE.

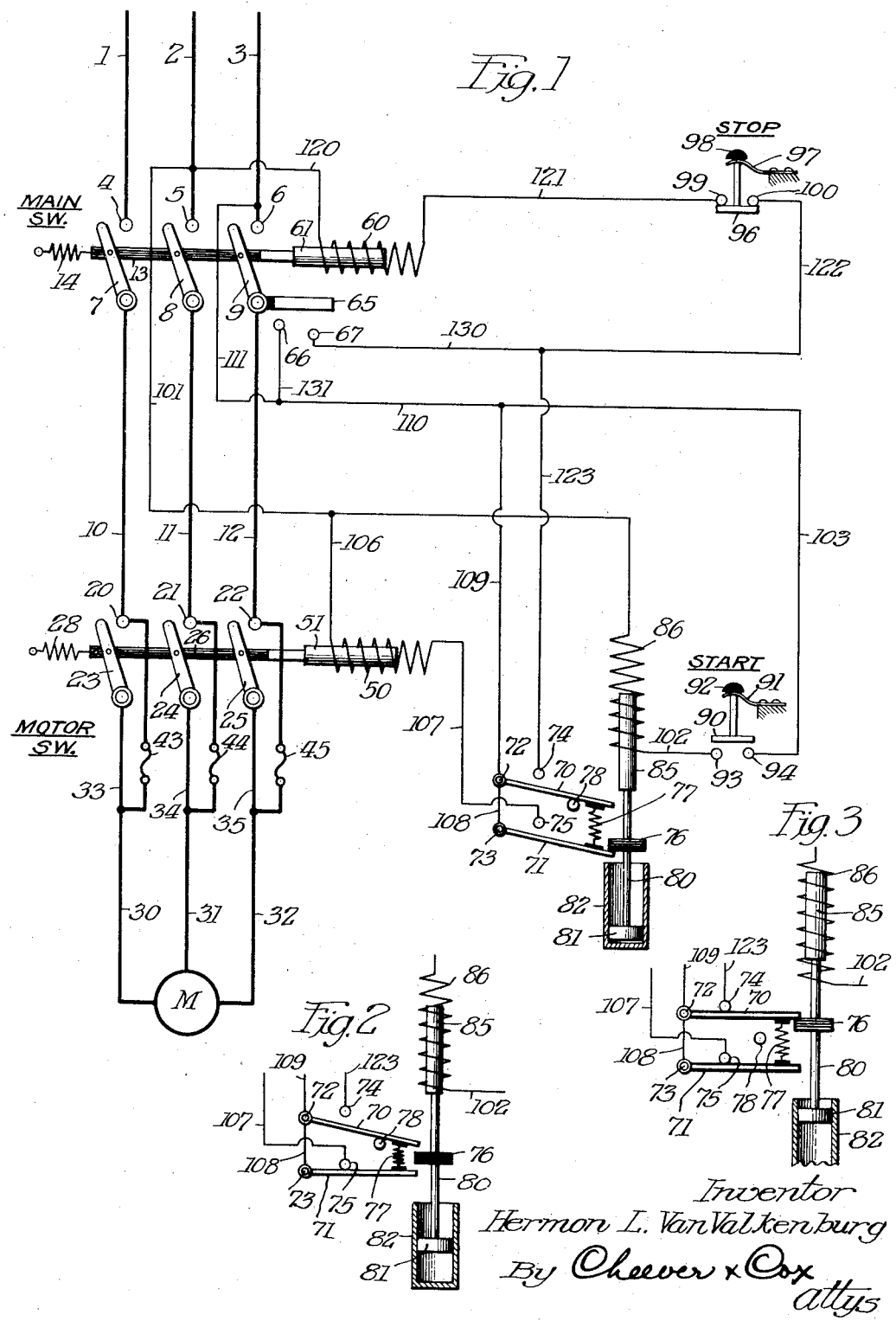

HERMON L. VAN VALKENBURG, OF MILWAUKEE, WISCONSIN, ASSIGNOR TO INDUSTRIAL CONTROLLER COMPANY, OF MILWAUKEE, WISCONSIN, A CORPORATION OF WISCONSIN.

MOTOR-STARTER.

1,319,191.  Specification of Letters Patent.  Patented Oct. 21, 1919.

Application filed October 28, 1918. Serial No. 260,057.

*To all whom it may concern:*

Be it known that I, HERMON L. VAN VALKENBURG, a citizen of the United States, residing at Milwaukee, in the county of Milwaukee and State of Wisconsin, have invented a certain new and useful Improvement in Motor-Starters, of which the following is a specification.

My invention relates to motor starters and contemplates the use of a main switch for opening and closing the connection to the supply line, and a motor switch for establishing one set of conditions during the period of acceleration and another set after the motor has attained its normal speed. In certain respects my present invention is analogous to the one shown in my co-pending application filed September 7, 1918, Serial Number 253,034. The apparatus shown in that application is intended more especially for motors of larger size while the present apparatus is intended more particularly for smaller motors, for example 5 horse power or less. In operating these smaller motors it is not necessary to employ such protective devices as autotransformers or rheostats, but full line current may be supplied at starting. However, in starting motors with full line current the initial rush of current is frequently great enough to blow the fuses employed to protect the motor from excess current due to abnormal conditions such as excess voltage on the line. This difficulty has been avoided by making it possible to supply the current at first through a shunt circuit, and then, after the necessary counter E. M. F. has been generated, open the shunt circuit and supply the motor through the fuses. The general object of my invention is to provide an apparatus whereby upon the closing of the master switch the motor will be automatically supplied direct from the line, and after the lapse of a proper interval with current through the fuses. More specifically it is my purpose to provide apparatus having a main switch and a motor switch, the main switch being closed only upon the closing of the master switch, and the motor switch first occupying a position which will supply current to the motor direct, and afterward changing to the position where the current will be supplied to the motor through the fuses, the main switch remaining closed so long as it is desired to have the motor run and providing the current in the supply lines does not drop below a predetermined minimum.

In the form selected to illustrate the invention the master switch is of the momentary contact type, such as a push button. The switch is normally open, and by closing it momentarily the rest of the apparatus performs its function in proper sequence. A normally closed switch is also provided which, if momentarily opened, causes the main switch to open and cut off the supply of current to the motor. One of the contributory objects of the invention is to provide a construction such that the contactor of the motor switch will be moved to starting position at or before the closure of the main switch. Other contributory objects will appear from the detailed description hereinafter given.

I accomplish my objects by the apparatus illustrated in the accompanying drawings in which—

Figure 1 is a diagram of the complete apparatus shown in its normal pre-starting condition.

Fig. 2 is a diagrammatic representation of the controlling switch showing the position which the parts will occupy almost immediately after the master switch is closed, and Fig. 3 is similar to Fig. 2, but shows the parts in the position they will occupy almost immediately after they reach the position shown in Fig. 2.

Similar numerals refer to similar parts throughout the several views.

In the type illustrated in the drawings the supply lines 1, 2 and 3 terminate in stationary contacts 4, 5 and 6 respectively, which coöperate with the switch arms or contactors 7, 8 and 9 respectively. These contactors are part of the main switch and are permanently connected to the conductors 10, 11 and 12 respectively. The contactors are all mechanically connected to a bar 13 so that they will operate in unison, and they are biased toward open position by means of a spring 14.

The conductors 10, 11 and 12 are connected to stationary contacts 20, 21 and 22 respectively, adapted to coöperate with switch arms or contactors 23, 24 and 25 respectively. These are all connected to a bar 26 so that they will operate in unison and are biased toward open, running position by means of a spring 28. The motor M is supplied through conductors 30, 31 and 32, each having two branches. The branches 33, 34 and 35 respectively lead to the contactors 23, 24 and 25 respectively. The other branches lead through the fuses 43, 44 and 45 respectively. Said fuses are connected respectively to the contacts 20, 21 and 22. The contactors 23, 24 and 25 are part of the motor switch and in their normal position, to which they are biased by spring 28, are open so that current arriving at the contacts 20, 21 and 22 will pass to the motor through the fuses. A coil 50 has a plunger 51 connected to bar 26 in such manner that when the coil is energized the contactors will be moved to closed position in engagement with the contacts 20, 21 and 22, respectively, and short circuit the fuses. It may thus be said that the motor switch is biased toward open position in which the current will be supplied through the fuses, but when the coil is energized the motor switch will close and short circuit the fuses. These constitute respectively the running and the starting positions. The pre-starting position is the same as the running position.

The main switch is similarly provided with a coil 60 having a core 61 connected to the bar 13 in such manner that when the coil is energized the main switch will be closed. A contactor 65 is mechanically connected to one of the arms of the main switch in such a manner that when the main switch is closed said contactor will bridge the stationary contacts 66 and 67 of the locking switch hereinafter referred to.

The coils 50 and 60 are controlled by a controlling switch having two switch arms or contactors 70 and 71 pivoted upon the studs 72 and 73 respectively, and adapted to engage stationary contacts 74 and 75 respectively. Arm 70 is normally supported upon a stop 78 while arm 71 is suspended from arm 70 by a tension spring 77. Said spring tends to hold the arm 71 in engagement with the contact 75, but the arm is normally held out of engagement by a tappet 76 secured to a rod 80, fastened to a plunger 81 working in a cylinder 82. These parts constitute a dash pot so constructed that when the rod 80 is pulled upward it will move quickly, but when released will descend slowly. This retarding device need not be here described in detail as similar devices are well known and a detailed description will be found in the co-pending application. Rod 80 is fastened to an electromagnetic plunger 85 working in a coil 86 in such manner that when the coil is energized the plunger will rise and cause the tappet to release the arm 71 and permit the spring 77 to bring it into engagement with the contact 75 as shown in Fig. 2. The continued rise of the tappet will then move the arm 70 into engagement with the contact 74 and the parts will then be in the position illustrated in Fig. 3.

The master switch is manually operated and is here shown as of the momentary contact, push button type. It has a contactor 90 normally held open by a spring 91. By pressing the button 92 the contact will be brought into engagement with the stationary contacts 93 and 94. The master switch just described is for starting. A second master switch, for stopping the motor has a contactor 96 normally held by a spring 97 in engagement with the contacts 99 and 100. By pressing the button 98 the circuit will be broken.

The operation may now be readily understood. Previous to starting, the parts will occupy the respective positions shown in Fig. 1, the main switch and motor switch both being open. If, now, the starting button 92 is pressed the coil 86 will be energized as follows:—from the line conductor 2, through conductor 101, coil 86, contactor 90, contact 93, contactor 90, contact 94, thence through the conductor 103 to the line conductor 3. The energization of the coil 86 will cause the tappet 76 to rise quickly from the position shown in Fig. 1. When the tappet is part way up as shown in Fig. 2 and has released the arm 71 of the controlling switch, the spring 77 will cause said arm to engage the contact 75 as shown in Fig. 2. As the tappet continues rising it lifts the arm 70 into engagement with the contact 74, the spring still holding the arm 71 in engagement with its contact 75, all as shown in Fig. 3. It will be noted that while the upward movement of the tappet is rapid it is nevertheless certain that the arm 71 will engage its contact 75 before the arm 70 engages its contact 74. This, as will presently appear, insures the closing of the motor switch not later than the closing of the main switch. As soon as the arm 71 reaches the contact 75 the coil 50 will be energized as follows: from line 2 through conductor 101, conductor 106, coil 50, conductor 107, contact 75, arm 71, conductor 108, conductor 109, conductor 110, conductor 111 to line conductor 3. This energization of the coil 50 causes the motor switch contactors to engage the contacts 20, 21 and 22 respectively and short circuit the fuses 43, 44 and 45. The motor switch is now in starting position ready for the closure of the main switch. The main switch closes substantially immediately, for as soon as the tappet 76 has reached the top of its movement the coil 60 will be energized as follows:—from the line 2 to conductor 120, coil 60, conductor 212, contact 99, contactor 96, contact 100, conductor 122, conductor 123, contact 74, arm 70, conductors 109, 110 and 111 to line 3. As soon as the main switch is closed it will stay closed until the attendant presses the stop button 98, for the contactor 65 of the locking switch simultaneously moves into engagement with the contacts 66 and 67, and thereafter the coil 60 will remain energized as follows: from line 2 through conductor 120, coil 60, conductor 121, contactor 96, conductor 122, conductor 130, contact 67, contactor 65, contact 66, conductor 131, conductor 111, to line conductor 3. Consequently, when the attendant releases the starting button 92 of the master switch, and the tappet 76 starts to descend and permits the arm 70 to fall away from the contact 74, the circuit through the coil 60 will be maintained through the locking switch 65 and the main switch will remain closed. The slowly descending tappet finally moves the arm 71 away from the contact 75 and breaks the circuit through the coil 50, thus releasing the motor switch and permitting it to return to normal open or running position, shown in Fig. 1. In this position current will be supplied to the motor through the fuses. If at any time the attendant presses the stop button 98 or the voltage the line drops below a predetermined minimum, the coil 60 becomes deënergized and releases the main switch, thus permitting it to open.

From the foregoing it will be evident that with my apparatus it is made certain that the motor switch will be closed and short circuit the fuses not later than the closing of the main switch; also that the release of the master switch will not permit the motor switch to be opened until a predetermined interval has elapsed during which the motor may attain its normal speed.

Having thus described my invention, what I claim as new and desire to secure by Letters Patent, is:—

1. In combination, an electromagnetically controlled motor switch having a starting and a running position, and being biased toward running position, a controlling switch for controlling said motor switch, said controlling switch being biased toward a position to cause the motor switch to be moved to running position, a master switch, electromagnetic means controlled by the master switch for moving said controlling switch against its bias to thereby cause the motor switch to be moved to starting position, and means for retarding the movement of the controlling switch in the direction of its bias, whereby a time limit is fixed below which the controlling switch cannot return to normal condition, nor, consequently, the motor switch to running position.

2. In combination, an electromagnetically controlled motor switch having a closed starting and an open running position and being biased toward running position, a controlling switch for controlling said motor switch, said controlling switch being biased toward a position to cause the motor switch to be moved to running position, a master switch, electromagnetic means controlled by the master switch for moving said controlling switch against its bias to thereby cause the motor switch to be moved to starting position, and means for retarding the movement of the controlling switch in the direction of its bias.

3. In combination, an electric motor, a protective element therefor, the motor circuit having two branches, one including the protective element and the other forming a shunt around it, an electromagnetically controlled motor switch for controlling the shunt branch, a controlling switch for controlling said switches, said controlling switch being biased toward normal position in which the main switch will be unaffected by it and the motor switch will be opened, a master switch, electromagnetic means controlled by said master switch for moving the controlling switch to abnormal position, against its bias, said controlling switch when in abnormal position, causing the closure of the main and motor switches, and a device for retarding the return of the controlling switch to normal position.

4. In combination, an electric motor, a protective element therefor, the motor circuit having two branches, one including the protective element and the other forming a shunt around it, an electromagnetically controlled motor switch for controlling the shunt branch, a controlling switch for controlling said switches, said controlling switch being biased toward normal position in which the main switch will be unaffected by it and the motor switch will be opened, a normally open, momentary contact master switch, electromagnetic means controlled by said master switch for moving the controlling switch to abnormal position, against its bias, said controlling switch when in abnormal position, causing the closure of the main and motor switches, and a device for retarding the return of the controlling switch to normal position.

5. In combination an electric motor, a protective element therefor, a normally open main switch, a motor switch which in starting position short circuits the protective element, and in running position causes the motor to be supplied through the protective element, said switches being controlled electromagnetically, a controlling switch having a first contactor adapted to cause the master switch to close and a second contactor adapted to cause the motor switch to move to starting position, a master switch, electromagnetic means controlled by said master switch and adapted to move said contactors in sequence, to first move the motor switch to starting position and then close the master switch; and a time limit device for returning the first contactor to initial position after a predetermined interval, said first contactor being adapted, when in initial position, to cause the motor switch to move to running position.

6. In combination an electric motor, a protective element therefor, a normally open main switch, a motor switch which in starting position short circuits the protective element and in running position causes the motor to be supplied through the protective element, said switches being controlled electromagnetically, a first contactor adapted when in closed position to cause the motor switch to move to starting position, and when in open position to cause the motor switch to move to running position, a second contactor adapted when in closed position to cause the main switch to close, and a reciprocating element adapted when traveling forward first to close the first contactors and thereby move the motor switch to starting position, and subsequently close the second contactor and thereby cause the main switch to close, said reciprocating element being adapted in returning to initial position to move the first contactor to open position, and thereby cause the motor switch to move to running position.

7. In combination an electric motor, a protective element therefor, a normally open main switch, a motor switch which in starting position short circuits the protective element and in running position causes the motor to be supplied through the protective element, said switches being controlled electromagnetically, a first contactor adapted when in closed position to cause the motor switch to move to starting position, and when in open position to cause the motor switch to move to running position, a second contactor adapted when in closed position to cause the main switch to close, a reciprocating element adapted when traveling forward first to close the first contactor and thereby move the motor switch to starting position, and subsequently close the second contactor and thereby cause the main switch to close, said reciprocating element being adapted in returning to initial position to move the first contactor to open position, and thereby cause the motor switch to move to running position, manually controlled electromagnetic means for quickly moving said reciprocating element forward, and a time limit device for gradually returning said reciprocating element.

In witness whereof I have hereunto subscribed my name.

HERMON L. VAN VALKENBURG.